United States Patent
Ramme et al.

(10) Patent No.: US 6,755,901 B1
(45) Date of Patent: Jun. 29, 2004

(54) AMMONIA REMOVAL FROM FLY ASH

(75) Inventors: Bruce W. Ramme, Okauchee, WI (US); Bryan C. Fisher, San Antonio, TX (US)

(73) Assignee: Wisconsin Electric Power Company, Milwaukee, WI (US)

( * ) Notice: Subject to any disclaimer, the term of this patent is extended or adjusted under 35 U.S.C. 154(b) by 36 days.

(21) Appl. No.: 09/807,643
(22) PCT Filed: Aug. 15, 2000
(86) PCT No.: PCT/US00/22398
§ 371 (c)(1), (2), (4) Date: Jul. 16, 2001
(87) PCT Pub. No.: WO01/12268
PCT Pub. Date: Feb. 22, 2001

Related U.S. Application Data
(60) Provisional application No. 60/149,295, filed on Aug. 17, 1999.

(51) Int. Cl.$^7$ .............................. C04B 18/08; C01C 3/00
(52) U.S. Cl. .................. 423/237; 423/352; 106/DIG. 1
(58) Field of Search .................... 106/DIG. 1; 423/352, 423/237, 360

(56) References Cited

U.S. PATENT DOCUMENTS
| | | |
|---|---|---|
| 4,911,900 A | 3/1990 | Horch et al. |
| 5,837,052 A | 11/1998 | Oates et al. |

FOREIGN PATENT DOCUMENTS
| | | |
|---|---|---|
| DE | 3425070 | 1/1986 |
| DE | 3526756 | 1/1987 |
| DE | 3708941 | 9/1988 |
| DE | 3732026 | 4/1989 |
| DE | 3802884 | 10/1989 |
| WO | WO 9408892 | 4/1994 |

*Primary Examiner*—Paul Marcantoni
(74) *Attorney, Agent, or Firm*—Quarles & Brady, LLP

(57) ABSTRACT

A method and apparatus for the application of beat to remove ammonia compounds from fly ask, thereby making the fly ash a marketable product is disclosed. The method includes the steps of providing an amount of fly ash wherein at least a portion of the amount of fly ash comprises particulates having ammonia compounds affixed to the particulates, and exposing the fly ash to flowing air having a temperature of at least 1,500° F. (815 ° C.) such that the fly ash is maintained in the flowing air until the fly ash reaches a temperature of at last 900° F. (482 ° C.). The apparatus (8,9) includes a source of fly ash (10) comprising particulates having ammonia compounds affixed to at least some of the fly ash particulates, a beating chamber (17) including a treatment bed comprising a floor (20) having openings a fly ash supply conduit (16) in communication with the heating chamber (17) and the source of fly ash (10) for transferring fly ash from the source of fly ash to the treatment bed of the heating chamber, a source of heated air (45), an air supply conduit (55) in communication with the source of heated of heated air (45) and the heating chamber (17) for providing a flow of heated air to the treatment bed of the beating chamber for contacting the fly ash on the treatment bed with the flow of air, a heated air conduit (27) in communication with the beating chamber (17) for transferring the flow of heated air form the heating chamber, and an ash removal conduit (31) in communication with the heating chamber (17) for transferring heated fly ash from the heating chamber.

17 Claims, 2 Drawing Sheets

AMMONIA REMOVAL FROM FLY ASH

CROSS-REFERENCE TO RELATED APPLICATION

This application claims priority from U.S. Provisional Patent Application No. 60/149,295 filed Aug. 17, 1999.

BACKGROUND OF THE INVENTION

This Invention relates to the treatment of coal ash to remove ammonia compounds that contaminate the ash as part of post-combustion treatments of exhaust gases to remove nitrogen compounds.

In 1990, the United States Environmental Protection Agency put into place the Clean Air Act Amendments which were designed to reduce the emissions of "greenhouse gases". Among the emissions covered are the nitrogen compounds NO and $NO_2$ referred to generically as NOx. NOx is generated through the combustion of coal and its generation is directly affected by combustion temperature, residency time and available oxygen. Several technologies have been developed to meet the mandated NOx reduction limits.

The NOx reduction technologies fall into two major categories. One category includes technologies that modify or control the combustion or firing characteristics. The effect of these approaches has been an increase in residual unburned carbon in the coal ash. The other category includes technologies that are employed after combustion has taken place. These technologies include selective non-catalytic reduction, selective catalytic reduction, and amine enhanced fuel lean gas reburn. These technologies involve adding ammonia ($NH_3$), and a significant amount of the ammonia finds its way onto the coal ash, typically by combining with available sulphur and other compounds that attach to the ash particles.

Coal ash is a marketable product if it is not contaminated. The ash may be used, for example, in concrete products as a replacement for a portion of the cement. However, ash that has been treated to reduce NOx and which is contaminated either by unburned carbon or ammonia compounds is not marketable.

Systems have been developed which may be used to reduce the amount of ammonia compounds affixed to fly ash. For example, German Patent Application No. 3526756 describes a process for the reduction of ammonia residues from the treated fly ash of a steam generator. In this process, ammonia contaminated fly ash is treated with a hot treating gas, e.g., air heated to 700° C. to 800° C., so that the ammonia Is driven off into the treating gas. In U.S. Pat. No. 4,911,900, there is disclosed an apparatus in which fly ash containing ammonium salts is recovered from the flue gas of a combustion chamber and then introduced Into a fluidized bed apparatus in which ammonia is driven off from the fly ash. The stripping of ammonia from the fly ash is affected in the fluidized bed apparatus by direct heating with a hot gas at 700° C. to 800° C. Ammonia containing gas from the fluidized bed apparatus is then supplied to an ammonia scrubber from which an ammonia solution is removed for storage. While these systems may be suitable for certain installations, they do have efficiency problems, such as excessive heat loss, that may limit their use in cost sensitive installations.

Therefore, there is a need for an improved method and apparatus that can solve the unburned carbon and ammonia contamination problems in fly ash. More particularly, there is a need for an improved method and apparatus that can remove ammonia compounds from fly ash, and/or consume unburned carbon in fly ash to make the fly ash a marketable product.

SUMMARY OF THE INVENTION

Accordingly, the present invention is directed to a method and apparatus for the application of heat to remove ammonia compounds from fly ash, thereby making the fly ash a marketable product. The method of the invention is directed to a method for reducing the amount of ammonia compounds affixed to fly ash including the steps of providing an amount of fly ash wherein at least a portion of the amount of fly ash comprises particulates having ammonia compounds affixed to the particulates, and exposing the fly ash to flowing air having a temperature of at least 1,500° F. (815° C.) such that the fly ash is maintained in the flowing air until the fly ash reaches a temperature of at least 900° F. (482° C.).

The apparatus of the invention is directed to an apparatus for reducing the amount of ammonia compounds affixed to fly ash wherein the apparatus includes a source of fly ash comprising particulates having ammonia compounds affixed to at least some of the fly ash particulates, a heating chamber including a treatment bed comprising a media having openings, a fly ash supply conduit in communication with the heating chamber and the source of fly ash for transferring fly ash from the source of fly ash to the treatment bed of the heating chamber, a source of heated air, an air supply conduit in communication with the source of heated air and the heating chamber for providing a flow of heated air to the treatment bed of the heating chamber for contacting the fly ash on the treatment bed with the flow of heated air, a heated air conduit in communication with the heating chamber for transferring the flow of heated air from the heating chamber, and an ash removal conduit in communication with the heating chamber for transferring heated fly ash from the heating chamber.

Fly ash is a particulate material collected from the effluent, or flue gases, of stationary combustion sources, such as coal, oil, or municipal solid waste burning power plants. It generally comprises a very fine dust with particles mostly in the silt size range. The physical and chemical properties of fly ash vary according to the combustion source, depending on the source of fuel, burning and handling methods, and also the addition of materials both prior to and subsequent to combustion (such as nitrogenous NOx reducing treatment agents), as well as the addition of materials to aid in the fly ash collection process.

The principle constituents of fly ash are silica (silicon dioxide, $SiO_2$), alumina (aluminum oxide, $Al_2O_3$), calcium oxide (CaO), and iron oxide (FeO). As is well known, the actual composition of fly ash can vary widely, and in fact, the ranges provided are merely representative of common fly ash compositions. In addition to those compositions detailed above, common combustion fly ashes also contain other components, as well as unburned carbon. Generally, fly ashes have a specific gravity which can range between about 2.1 and about 2.6. Most of the particles of fly ash are glassy spheres, except for the carbon particles, which are somewhat larger and more angular than the inorganic particles. Fly ash particles generally have an average size which can range from less than about 1.0 to about 80 microns in diameter, more commonly between about 1.0 and about 30.0 microns in diameter.

The fly ash is generated by the combustion of coal, oil, municipal solid waste, or other materials in a stationary combustion source such as an electricity generating utility or other like system. The fly ash is carried along with the combustion effluent, which often contains nitrogen oxides, a known pollutant. Nitrogen oxides are created when atomic oxygen and nitrogen are formed in the high temperature atmosphere generated.

The nitrogen oxides level in the combustion effluent can be reduced by the introduction of a nitrogenous treatment agent, either in and of itself or to facilitate a selective catalytic reduction process. The most common agents for the non-catalytic reduction of nitrogen oxides are urea and ammonia, which can be introduced according to a number of different processes effective for reducing nitrogen oxides. The catalytic reduction of nitrogen oxides generally involves passing the effluent across the catalyst bed in the presence of ammonia. Selective catalytic reduction processes for reducing NOx are well known and utilize a variety of catalytic agents.

Regardless of the specific method by which nitrogen oxides are being reduced by the introduction of a nitrogenous treatment agent, it is virtually impossible to prevent at least some ammonia from affixing to fly ash. When this occurs, ammonia becomes affixed to the fly ash, primarily by being reacted therewith, and is absorbed onto the fly ash. Most often, the ammonia is present on the ash in the form of ammonium salts, such as ammonium chloride, ammonium sulfate, and ammonium bisulfate, as well as absorbed free ammonia. As used herein, the term "ammonia compounds" shall be used to refer to these substances, that is, ammonia ($NH_3$) and compounds including the ammonium ion ($NH_4$).

In order to prevent the fly ash from being emitted to the atmosphere, it is collected by conventional apparatus such as in a baghouse, an electrostatic precipitator, or like means. The ash is then transported either to disposal, such as in a landfill or strip mine, or to be r used such as for structural fill or In the formation of cement or other building materials.

In order to liberate or strip the affixed ammonia from the combustion fly ash after it has been collected as described above, it is exposed to moving air under conditions effective to strip a substantial amount of the ammonia from the ash. Although this description is written in terms of moving air, the term will be understood to include dry air, as well as air containing water vapor, and steam.

It is therefore an advantage of the present invention to provide an effective and efficient system and apparatus for removing ammonia compounds and other contaminants from fly ash.

BRIEF DESCRIPTION OF THE DRAWINGS

The features, aspects, and advantages of the present invention will become better understood upon consideration of the following detailed description, appended claims and accompanying drawings where:

FIG. 1 is a diagrammatic illustration of an apparatus for carrying out the invention; and.

Figure 1:
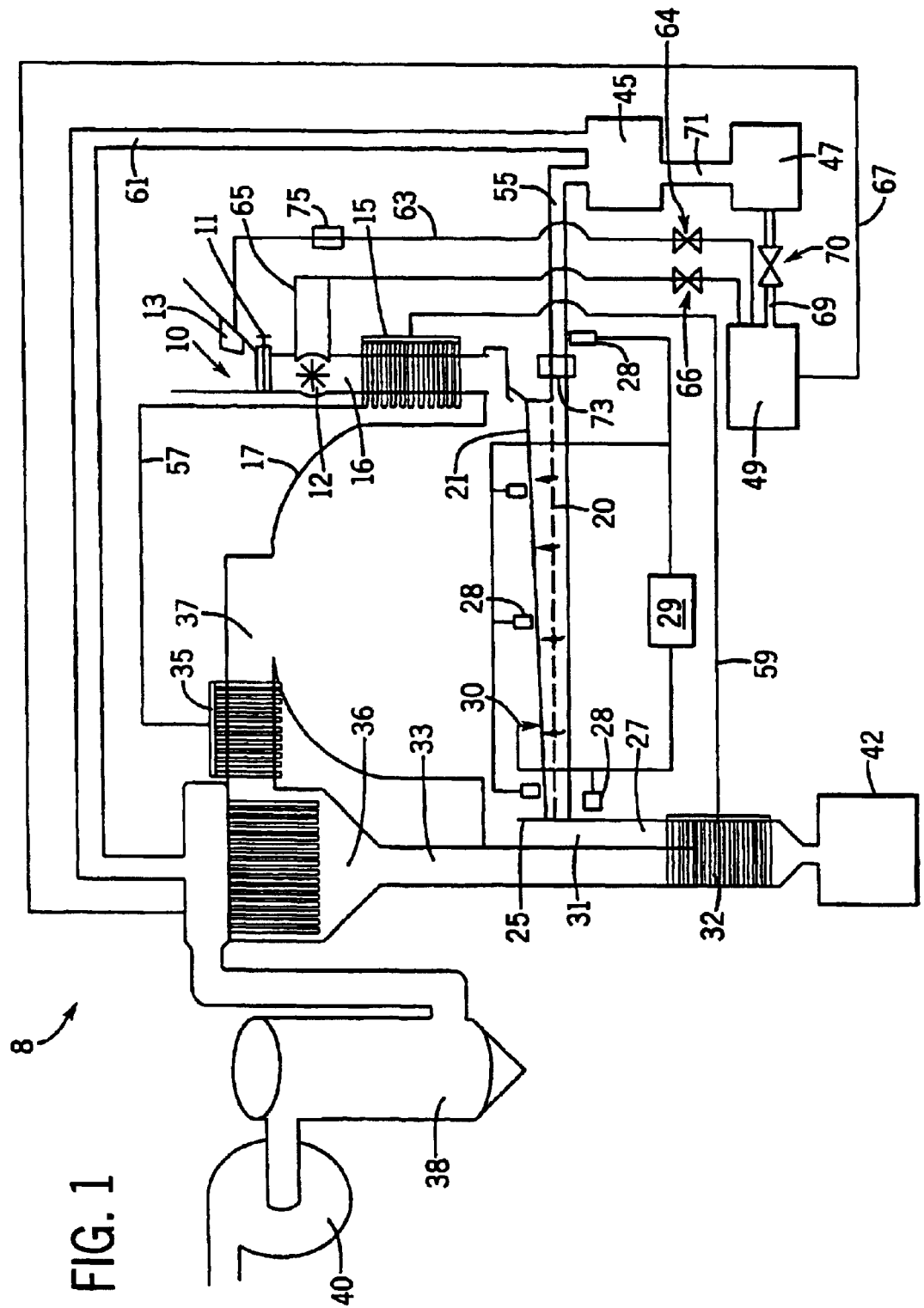

It should be understood that the drawings are not necessarily to scale and that the embodiments are sometimes illustrated by phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

Referring to FIG. 1, there is shown an apparatus, indicated generally at 8, for reducing the amount of ammonia compounds affixed to fly ash. The apparatus 8 includes an ash storage unit 10 that holds the ammonia contaminated ash that will be treated in the process of the invention. The ash may be coal ash from coal boilers utilizing NOx reduction systems incorporating ammonia compounds. Typically, such systems collect ashes through a dry process such as an electrostatic precipitator, a baghouse or a cyclone. The ash storage unit 10 may be a standard storage silo, preferably configured with sufficient height to allow for gravity feed. A maintenance gate 11 closes the bottom of the ash storage unit 10 to halt the flow of ash for maintenance of the equipment downstream. The ash storage unit 10 may be replaced by a feed directly from equipment that is collecting the ash from a furnace and NOx removal system. Ashes collected from the NOx removal system of a furnace typically maintain a temperature of 110° F. (43° C.) or higher. Preferably, process equipment is selected to maintain or increase this temperature. For example, the ash storage unit 10 may have insulated walls or may Include aeration stones 13 which receive air from an air supply unit 49 via conduit 63 (having pressure gauge 75) for aeration of the ash with heated air.

The ammonia contaminated ash is fed from the ash storage unit 10 through a rotary air lock in the form of a high temperature rotary feeder 12. The rotary feeder 12 receives air from the air supply unit 49 via conduit 65 with an inline valve 66 that assists in maintaining a steady feed and depth of ash to a preheating section which includes an ash preheater 15. A suitable rotary feeder is available from Delta/Ducon Conveying Technology, Inc., Malvern, Pa., USA. The ash flows through conduit 16 wherein ash preheater 15 preheats the ash preferably to 300° F. (148° C.) or above, and most preferably to approximately 500° F. (260° C.), using a bulk flow heat exchanger in the form of a series of vertical plates. The plates of the ash preheater 15 receive heat from a bulk flow heat exchanger 32 via conduit 59 and from a heat recovery unit 35 via conduit 57 as will be described further below. A suitable ash preheater is available from Cominco Engineering Services of Calgary, Alberta, Canada.

The preheated ash is fed into an insulated heating chamber 17 either as a batch or continuous process. The chamber 17 includes a treatment bed with a downwardly sloping floor 20 formed of a porous metal material, preferably an alloy sold under the designation "Inconel 600". Either a vibratory feeder or a rotary vane feeder may be used to deposit the preheated ash onto the floor 20. A vibratory feeder is preferred due to its economy of operation and high heat applicability. Hot air is passed through the porous metal material of the floor 20 to provide both heat and fluidization to move the ash deposited on the floor 20. The result is a fluidized bed conveyor 21. A suitable fluidized bed conveyor is available as an airslide from Delta/Ducon Conveying Technology, Inc., Malvern, Pa., USA. The porous metal media that supports the ash bed may be 0.062 inches (1.57 millimeters) thick and preferably has openings of 10 microns or less. A suitable porous metal media is available from Mott Metallurgical Corporation of Farmington, Conn., USA.

The heated air is passed through the porous metal media of the floor 20 to provide for uniform aeration and heating of the ash bed. The hot aeration air is provided such that a minimum of ash particles are carried out of the treatment area. This is accomplished through the design of the porous media sizing, the aeration air pressure and the air temperature. The heated air is passed through the ash bed at a specific flow rate which is designed to maximize the heat uptake by the ash bed and provide for the removal of the decomposed ammonia compounds. The same aeration air provides the fluidization to move the ash through the heating chamber in a continuous process or to move ash out of the chamber in a batch system.

The hot air passed through the floor 20 may come from a direct fired natural gas burner, oil fired burner, electrical heat source, or waste heat source, such as the waste heat of a combustion turbine. In the apparatus of FIG. 1, the hot air passed through the floor 20 comes via a conduit 55 from a gas furnace 45 that receives preheated air from an air preheater 47 via a conduit 71. The air preheater 47 receives air from the air supply unit 49 (such as a compressor) via a conduit 69 with an inline valve 70 that controls the flow of air into the air preheater 47. A programmable logic controller 29 receives signals from a pressure gauge 73 in the conduit 55 and provides control signals to valve 70 in order to control air flow into the air preheater 47 and the furnace 45. Preferably, the hot air is supplied to the floor 20 from the furnace 45 at a pressure from greater than 0 to about 3 psi (0.0207 MPa). At these pressures, the metal media will pass air heated at a temperature of at least 1500° F. (815° C.), and preferably in the range of 1500° F. (815° C.) to 1700° F. (927° C.), into the ash bed 21 at approximately 0 to about 10 cubic feet (0.28 cubic meters) per minute. One advantage to using flowing air having a temperature of at least 1500° F. (815° C.) is that more rapid heating of the fly ash and a resulting faster release of ammonia compounds occurs. The ammonia compounds common to NOx reduction technologies are liberated from the ash by heats of at least 900° F. (482° C.), preferably 980° F. (526° C.) or greater, and are carried away from the ash by the air. Temperatures in excess of 900° F. (482° C.) provide increased process efficiencies. For example, one advantage to heating the ash to temperatures of at least 900° F. (482° C.) is that complete removal of ammonia compounds from the fly ash occurs. Ammonia may be found on fly ash as several different compounds, such as ammonium bisulfate and ammonium sulfate. It has been discovered that the removal temperature for ammonium bisulfate is 813° F. (434° C.) and the removal temperature for ammonium sulfate is 808° F. (431° C.), while other ammonia compounds are liberated at lower temperatures. By heating the ash to temperatures of at least 900° F. (482° C.), it is assured that the various ammonia compounds are removed from the fly ash. The liberating air also provides the motive force or fluidization that allows the ash particles to move within the treatment bed.

The ash should be retained in the treatment bed 21 until it reaches a minimum temperature of 900° F. (482° C.). A blocking means such as a weir or a dam 25 is used to retain the ash in the heating chamber 17. As ash is fed into the beginning of the bed 21, the fluidized ash level rises. As the ash level rises, the clean ash at the exit area spills over the weir or dam 25 and drops through conduit 31 into a heat recovery zone 27. A series of thermocouples 28 in electric communication with the controller 29 may be used to control the valve 66 that controls air input to the rotary feeder 12 to control ash input to the heating chamber 17 in response to the measured ash exit temperature. As the target temperature is reached by the ash, more ash is fed into the bed 21 via the rotary feeder 12. The programmable logic controller 29 uses data from the thermocouples 28 and a level probe 30 to monitor and control heat exchange rates, to control ash feed rates from the rotary feeder 12, to control treatment bed air flow from the furnace 45 (by control of valve 70) and to monitor ash temperatures within the system.

An alternative to using a weir or dam 25 as the ash outflow blocking means is the use of a gate to retain ash in the heating chamber 17. As the ash in the heating chamber 17 reaches the designated temperature as determined by thermocouples 28 in electrical communication with controller 29, the controller 29 causes the gate to raise allowing a portion of heated ash to exit the bed 21. The controller 29 also causes ash to be fed into the bed 21 via rotary feeder 12. The use of a gate mechanism aids in preventing incoming ash from short circuiting the bed 21, allowing only heated ash from the bottom of the ash bed and in close contact with the incoming hot air, to exit the heating chamber 17.

The heat recovery zone 27 is equipped with a bulk flow heat exchanger 32 which transfers heat from the treated ash to the plates of the ash preheater 15 via conduit 59 as described above. The ash leaving the system is cooled and transferred to a storage unit 42. Dilute pneumatic transfer from the heat recovery zone 27 to the storage unit 42 may be used to further cool the ash. The ash in storage unit 42 may then be stored and managed using conventional means.

The upper portion of the heating chamber 17 is domed to provide a static pressure area. The gases and any entrained fly ash from the heating chamber 17 pass through conduit 37 Into a heat recovery unit 35 in the form of a heat exchanger which transfers heat from the gases and any entrained fly ash to the plates of the ash preheater 15 via conduit 57 as described above. The heat recovery unit 35 cools the gas and entrained fly ash mixture and provides heat to the ash in the pretreatment area via ash preheater 15. The gas and entrained fly ash mixture may then pass to a high temperature baghouse 36 operated at a temperature in excess of 400° F. (204° C.) to ensure that the ammonia contaminants remain in a gaseous state thereby inhibiting reformation and deposition of the ammonia compounds on the ash and equipment surfaces. A suitable high temperature baghouse is available from Bundy Environmental Technology, Inc., Reynoldsburg, Ohio, USA. The baghouse 36 captures fugitive ash particles, and the clean ash collected by the baghouse 36 is transferred via conduit 33 to the heat recovery zone 27 where the bulk flow heat exchanger 32 transfers heat from the fly ash to the plates of the ash preheater 15 via conduit 59 as described above. The fly ash leaving the system is cooled and transferred to a storage unit 42. Dilute pneumatic transfer may be used to further cool the fly ash.

A contaminated air stream also exits the baghouse 36 and enters a wet scrubber 38 where the ammonia and other contaminants are collected. The scrubbing liquor may be alkaline or acidic, depending on the desires of the facility using the apparatus 8. An acidic media will capture several gas constituents including ammonia and sulfur. An alkaline media will capture the sulfur while allowing the ammonia to pass to the next stage. The scrubber 38 also provides for quenching of the hot gases to a temperature that will not harm a fan 40 that creates a negative pressure on the system to carry contaminated air from the bed 21 through the baghouse 36 and through the wet scrubber 38. Preferably, the induced draft fan 40 pulls a negative pressure on the heating chamber 17 of approximately 1–3 inches (25.4–76.2 millimeters) of water to provide the motive force to draw gas through the baghouse 36 and the scrubber 38. The type of scrubbing system employed determines whether the collected contaminants are disposed of or processed for utilization. The scrubber system may be that supplied by Bionomic Industries of Oceanside, Calif., USA.

Figure 2:
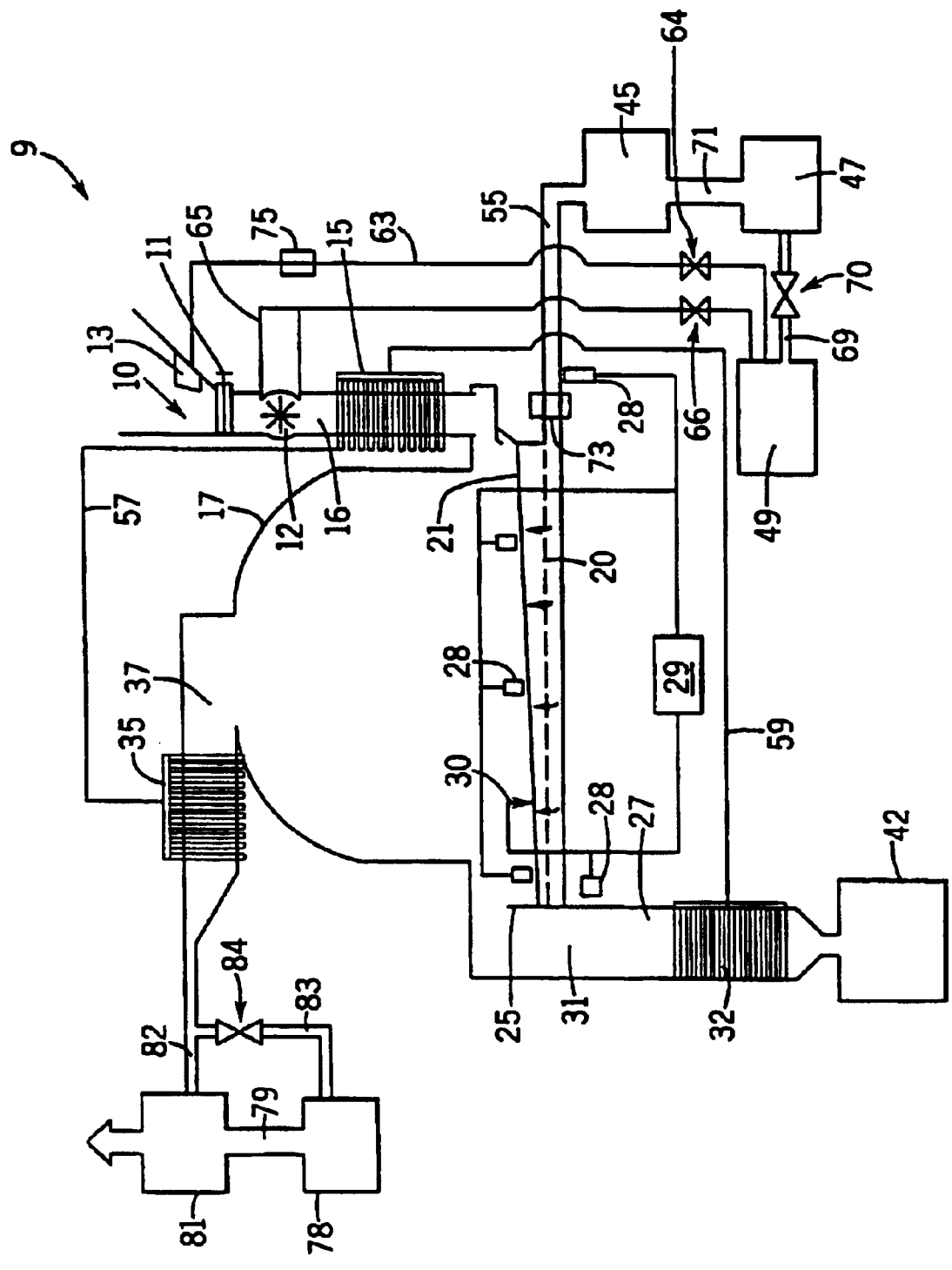
FIG. 2 is a diagrammatic illustration of another embodiment of an apparatus for carrying out the invention.

Turning now to FIG. 2, there is shown an another embodiment of an apparatus, indicated generally at 9, for the removal of ammonia compounds from fly ash. The apparatus 9 has many of the components and operating parameters as the apparatus 8 shown in FIG. 1. However, in the apparatus 9 of FIG. 2, the baghouse 36, the wet scrubber 38 and the fan 40 are removed from the apparatus 8 as shown in FIG. 1. In the apparatus 9 of FIG. 2, the gases and any entrained fly ash from the heating chamber 17 are cooled below 400° F. (204° C.) and directed towards the Inlet duct of a NOx treatment system 81 (such as a selective catalytic reduction system) that receives exhaust gases from a steam generator 78 (such as a coal combustion boiler) via conduit 79. The NOx treatment system 81 utilizes the ammonia that was liberated from the ash in the heating chamber 17. A portion of the gases and any entrained fly ash from the heating chamber 17 may also be introduced into the steam generator 78 via conduit 83 having inline valve 84.

The use of the present invention to achieve substantial reductions in the amount of ammonia compounds affixed to post-combustion fly ash and to achieve reductions in loss on ignition (carbon) levels is illustrated by the following laboratory tests that were performed on fly ash conforming to specifications of the American Society for Testing and Materials (ASTM) for fly ash used in concrete.

Example 1

A sample of ASTM C-618 Class C fly ash containing ammonia was obtained from a coal fired steam generator. The sample of fly ash was measured for ammonia levels and it was determined that the ammonia levels were 51 mg./kg. The sample of fly ash was also measured for loss on ignition (carbon) levels and it was determined that the loss on ignition (carbon) levels were 0.4%. The sample of fly ash was then continuously heated at 1000° F. (538° C.) until a constant mass was attained and thus no loss on ignition (carbon) remained in the fly ash. The heated sample of fly ash was then measured for ammonia levels and it was determined that the ammonia levels were less than 2 mg./kg. This test confirmed that both ammonia and loss on ignition (carbon) were removed from the sample of ASTM C-618 Class C fly ash containing ammonia when heated at 1000° F. (538° C.).

Example 2

A sample of ASTM C-618 Class F fly ash containing ammonia was obtained from another coal fired steam generator. The sample of fly ash was measured for ammonia levels and it was determined that the ammonia levels were 170 mg./kg. The sample of fly ash was also measured for loss on Ignition (carbon) levels and it was determined that the loss on ignition (carbon) levels were 2.9%. The sample of fly ash was then continuously heated at 1000° F. (538° C.) until a constant mass was attained and thus no loss on ignition (carbon) remained in the fly ash. The heated sample of fly ash was then measured for ammonia levels and it was determined that the ammonia levels were less than 2 mg./kg. This test confirmed that both ammonia and loss on ignition (carbon) were removed from the sample of ASTM C-618 Class F fly ash containing ammonia when heated at 1000° F. (538° C.).

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for reducing the amount of ammonia compounds affixed to fly ash, the method comprising:
   introducing an amount of fly ash into a heating chamber, at least a portion of the amount of fly ash comprising particulates having ammonia compounds afford to the particulates;
   exposing the amount of fly ash to flowing air having a temperature of at least 1500° F.;
   transferring heat from gases exiting the heating chamber to preheat a second amount of fly ash, at least a portion of the second amount of fly ash comprising particulates having ammonia compounds affixed to the particulates;
   introducing the second amount of fly ash into the heating chamber; and
   exposing the second amount of fly ash to flowing air having a temperature of at least 1,500° F.

2. The method of claim 1 wherein:
   the amount of fly ash is maintained in the flowing air until the amount of fly ash reaches a temperature of at least 900° F.

3. The method of claim 1 further comprising:
   measuring an in process ash temperature of the amount of fly ash when the amount of fly ash is exposed to the flowing air; and
   removing at least a portion of the amount of fly ash b ing exposed to the flowing air when the measured in process ash temperature reaches at least 900° F.

4. The method of claim 1 further comprising:
   preheating the amount of fly ash to a temperature of at least 300° F. before exposing the amount of fly ash to the flowing air.

5. The method of claim 1 wherein:
   the second amount of fly ash is preheated to a temperature of at least 300° F.

6. The method of claim 1 further comprising:
   removing particulate material from the flowing air after heat has been recovered from the flowing air.

7. The method of claim 6 further comprising:
   maintaining the flowing air above 400° F. when particulate material is removed from the flowing air.

8. The method of claim 6 further comprising:
   recovering heat from the particulate material after the particulate material has been removed from the flowing air.

9. The method of claim 8 further comprising:
   using the heat recovered from the particulate material to preheat the second amount of fly ash.

10. The method of claim 9 wherein:
    the second amount of fly ash is preheated to a temperature of at least 300° F.

11. The method of claim 1 further comprising:
    recovering heat from the amount of fly ash after the amount of fly ash has been exposed to the flowing air.

12. The method of claim 11 further comprising:
    using the heat recovered from the amount of fly ash to preheat the second amount of fly ash.

13. The method of claim 12 wherein:
    the second amount of fly ash is preheated to a temperature of at least 300° F.

14. The method of claim 1 wherein the step of exposing the amount of fly ash to flowing air comprises:
    providing a metal media having openings;
    passing flowing air through the openings; and
    depositing the amount of fly ash on the metal media.

15. The method of claim 14 wherein:
    the openings are 10 microns or less.

16. The method of claim 14 wherein:
    the flowing air is passed through the openings at greater than 0 to about 10 cubic feet per minute.

17. The method of claim 1 further comprising:
    measuring an in process ash temperature of the amount of fly ash when the amount of fly ash is exposed to the flowing air; and
    controlling a flow rate of the flowing air in response to the measured in process ash temperature.

* * * * *

UNITED STATES PATENT AND TRADEMARK OFFICE
CERTIFICATE OF CORRECTION

PATENT NO. : 6,755,901 B1
DATED : June 29, 2004
INVENTOR(S) : Bruce W. Ramme et al.

It is certified that error appears in the above-identified patent and that said Letters Patent is hereby corrected as shown below:

Title page,
Item [57], ABSTRACT.
Line 1, "beat" should read -- heat --.
Line 2, "ask" should read -- ash --.
Lines 13, 22 and 24, "beating" should read -- heating --.

Column 3
Line 27, "r used" should read -- reused --.

Column 8,
Line 11, "b ing" should read -- being --.

Signed and Sealed this

First Day of February, 2005

JON W. DUDAS
*Director of the United States Patent and Trademark Office*